United States Patent [19]
Burt et al.

[11] Patent Number: 5,592,627
[45] Date of Patent: Jan. 7, 1997

[54] PIPELINED, SLIDING-WINDOW, FLOW CONTROL FOR END-TO-END COMMUNICATION SESSIONS

[75] Inventors: Denis Burt, Medway, Mass.; Patrick Pagano; Dwayne Waite, both of Pittsburgh, Pa.

[73] Assignee: Emprise Technologies, L.P., Wilmington, Del.

[21] Appl. No.: 321,176

[22] Filed: Oct. 11, 1994

[51] Int. Cl.$^6$ ........................................................ G06F 13/00
[52] U.S. Cl. ........................... 395/200.13; 395/200.12; 395/849; 364/DIG. 1; 364/242.96; 364/232.22
[58] Field of Search ............................... 395/800, 200.01, 395/200.13, 200.12, 849, 94.1–94.3

[56] References Cited

U.S. PATENT DOCUMENTS 5,517,622  5/1996  Ivanoff et al. ..................... 395/200.13
5,528,595  6/1996  Walsh et al. ......................... 370/85.13

OTHER PUBLICATIONS

Behl et al, "Advanced SNA/IP; A Simple SNA Transport Protocol", Network Working Group, RFC 1538, Oct., 1993, pp. 1–10.
Prue et al, "Something a Host Could Do with Source Quench: The Source Quench Introduced Delay (SQUID)", Network Working Group, RFC 1016, Jul. 1987, pp. 1–18.
Throop et al, "SNMP MIB Extensions for X.25 LAPB", Network Working Group, RFC 1381, Nov. 1992, pp. 1–33.
Chapter 4: The Data Link Layer, pp. 148–164, 1981.
VTAM Network Implementation Guide, pp. 179–218, Mar. 1992.

SNA Transaction Programmer's Reference Manual for LU Type 6.2, pp. 2–3 through 2–8, B–9 through B–12 and B–19 through B–22, Sep. 1990.
Chapter 1: Introduction, pp. 10–27. Chapter 8: The Transport And Session Layers, pp. 376–381. Chapter 9: The Presentation Layer, pp. 432–435, 1981.

*Primary Examiner*—Mehmet B. Geckil
*Attorney, Agent, or Firm*—Kirkpatrick & Lockhart LLP

[57] ABSTRACT

The present invention is directed to a method of, and apparatus for, improving the efficiency of transferring data between a transmitting unit and a receiving unit in an end-to-end layer of a network which does not support full duplexed communication at the end-to-end layers. The method comprises the steps of determining a window size N, where N represents the number of frames which can be received by the receiving unit. The transmitting unit: sets a current window size equal to 2N minus one; accepting a frame of data for transmission; decrements the current window size; transmits the data if the current window size does not equal zero or, if the current window size equals zero, waits to receive a message from the receiving unit before transmitting the data; resets the current window size to the current window size plus N upon receipt of the message: and returns to the accepting data step if all data has not been sent. The receiving unit: sets a current window size equal to N; receives a frame of data from the network; decrements the current window size; sends the message to the transmitting unit and resets the current window size equal to N if the current window size equals zero; transfers the received data; and returns to the receiving data step if there is more data to be received.

4 Claims, 4 Drawing Sheets

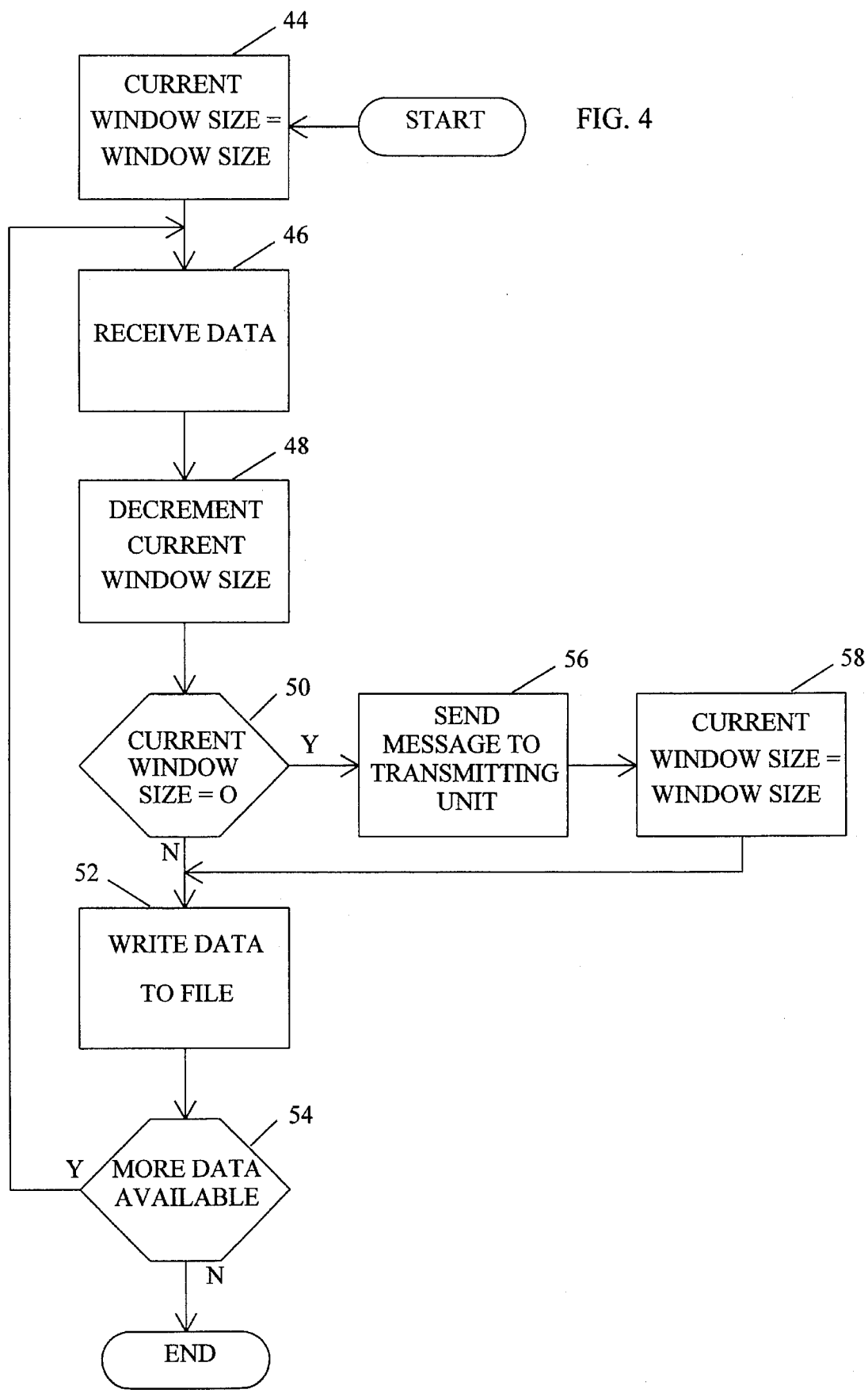

PIPELINED, SLIDING-WINDOW, FLOW CONTROL FOR END-TO-END COMMUNICATION SESSIONS

BACKGROUND OF THE INVENTION

1. Field of the Invention

The present invention is directed to communication protocols and, more particularly, to an apparatus and method for enabling pipelined, sliding-window flow control for end-to-end communication sessions over a half duplex communication channel.

2. Description of the Invention Background

Most computer networks are organized as a series of layers, with each layer being supported by the preceding layer. Dividing network functions among various layers simplifies the functions which each layer must perform. Each layer provides services to the layer directly above it, which services are provided in a transparent manner such that the layer receiving the services is not aware, and does not care, how the services are actually implemented. In that manner, a very complex network can be constructed of moderately complex, or even simple, layers.

Each layer communicates with the layer directly below it through an interface and communicates with the same layer on another machine through a protocol. No data is directly transferred from a layer on one machine to a layer on another machine, except at the lowest layer. At the lowest layer, there is physical communication between the machines. At levels above the lower level, communication between levels on different machines is virtual. The set of layers: and protocols is called the network architecture. The details of the implementation and the specification of the interfaces are not part of the architecture. Thus, it is not necessary that the interfaces on all machines be the same. It is, however, necessary that each machine correctly use all the protocols, otherwise the various layers of the network architecture will not be able to properly communicate.

Certain networks have become well known such as the Defense Advanced Research Projects Agency at the U.S. Department of Defense (ARPANET), IBM's Systems Network Architecture (SNA), and Digital Equipment Corporation's DEC-NET. The use of different system architectures raises the problem of communication between networks. As a first step toward international standardization of protocols, the International Standards Organization (ISO) has proposed a reference model of Open Systems Interconnection (OSI) which has seven layers. A model shown in FIG. 1 is closely based on the ISO OSI reference model. The lowest layer, called the physical layer, is concerned with transmitting raw bits over a communication channel. At the data link layer, the preparation of frames for transmission by the physical layer, or the organization into frames of data received from the physical layer, is carried out. The network layer, which is sometimes referred to as the communication subnet layer, controls the operation of the subnet. The network layer's primary function is to determine how packets of information are routed within the subnet. The transport layer's purpose is to accept a message from the layer immediately above it, i.e. the session layer, and divide the message up into packets to be handed to the network layer.

There is a difference between the transport layer, and all layers above it, from the physical, data link, and network layers. The transport layer, and all higher layers, are end-to-end layers in that a program on a source machine carries on a session with a similar program on a destination machine, using the appropriate control messages. At the network layer, and the lower layers, protocols are carried out by each machine and its immediate neighbors, which may or may not be the ultimate source and ultimate destination machines, i.e. the ultimate source and ultimate destination machines may be separated by many logical units. Thus, it is said that the physical, data link, and network layers are chained while the transport layer, and layers above it, are end-to-end.

The session layer acts primarily as the user's interface into the network. The session layer is responsible for establishing a connection with the destination machine. Once a connection is established, the session layer manages the dialogue between the source and destination machines.

The presentation layer is a layer which is provided to carry out frequently requested functions that merit having a general solution rather than complicating the topmost, or application layer. For example, the presentation layer may be used for text compression, encryption, or other similar functions which are of general interest and whose implementation is called upon sufficiently frequently to merit having the presentation layer perform that function.

The application layer is the layer at which applications are run. The content of the application layer is therefore up to the particular user.

There are several design issues that are present in most or all of the layers. For example, each layer must have a mechanism for establishing and terminating connections with other layers. Because a network normally has many different types of logical units connected to it, addressing the desired logical unit, establishing a connection, and terminating the connection when communication is completed, raises a number of problems. Additionally, at the data level, data may travel in one direction (simplex communication), travel in either direction (half-duplex communication), or travel in both directions simultaneously (full duplex communication). The protocol must also determine how many logical channels the connection corresponds to, and the priorities of those channels. Error detection and error correcting codes must also be implemented. Even when the foregoing issues have been addressed, a serious problem arises at every level with respect to how to keep a fast transmitting machine from swamping a slow receiving machine with data. A simple solution is to send a single frame, and await acknowledgement that the frame has been correctly received before sending the next frame. However, the time required for both the original message frame and the acknowledgement signal to be received can have a substantial impact on transmission efficiency. For example, consider a 50 kbps channel with a 500 millisecond round trip propagation delay. Consider the transmission of several 1,000-bit frames. At time t=0, the transmitting unit starts sending the first frame. At time t=20 milliseconds, the first frame has been completely sent. Not until time t=270 milliseconds has the frame fully arrived at the receiving unit, and not until time t=520 milliseconds has the acknowledgement signal sent by the receiving unit been received by the transmitting unit. That means that the transmitter was idle during 500 milliseconds of the 520 millisecond time period, or 96% of the time. Thus, only 4% of the available bandwidth was used.

If the requirement that the transmitting unit suspend transmissions until receiving an acknowledgement from the receiving unit can be circumvented, then a much more efficient use of the available band width can be obtained. One possible solution is to allow the transmitting unit to transmit up to W frames before waiting for an acknowledgement, instead of just one frame. With an appropriate choice of W, the transmitting unit will be able to continuously transmit frames for a time equal to the round-trip transit time without overloading the buffers of the receiving unit. In the above example, W should be at least 26. The transmitting unit begins sending at time t=0 as before. By the time it has finished sending 26 frames, at time t=520, the acknowledgement for the first frame will have just arrived. Thereafter, acknowledgements will arrive spaced by 20 milliseconds so the transmitter always gets permission to continue transmitting just when such permission is needed. At all times, no more than 26 unacknowledged frames are outstanding. That may be referred to as a window size of 26. Filling the communications channel with frames, and receiving an acknowledgement just in time for transmission of the next frame, is referred to as pipelining. As is apparent, pipelining provides a substantially more efficient use of available bandwidth than "stop-and-wait" communication schemes.

Pipelining can be implemented at various layers within the network provided that the communication protocols of that layer are designed to support pipelining. Unfortunately, there are numerous concerns at each layer directed to that layer's primary function, such that protocols are not always capable of supporting pipelining.

For example, consider IBM's SNA network, operating an LU6.2 protocol over a half-duplex communication channel. In that environment, at the application layer, there is no defined function to acknowledge the receipt of data other than having the transmitting application wait for acknowledgement prior to sending the next buffer of data. To address that particular problem, application programmers use one of two techniques. The transmitting unit may send data with a request indicator and then wait for a reply to insure that the request was processed successfully. To improve throughput, the request indicator may be sent only every N frames. Alternatively, the transmitting unit may send a confirmation request which implicitly waits for an acknowledgement from the receiving unit. To improve throughput, that may be done after N frames have been transmitted.

Those two approaches are functionally equivalent but implemented using different communication functions. The sending application for the confirmation request may be written as follows:

```
loop:
    Read Data from file.
    (MC_)Send_Data over communication network.
    Increment i
    If i>N
        (MC_)Confirm /* Send a Confirm Request and wait
            for Reply
        Set i = 0
    endif
goto loop:
```

The corresponding receiving application segment is:

```
loop:
    (MC_)Receive_And_Wait from communication network.
    If What_Received indicator is CONFIRM
        (MC_)Confirmed Reply over communication network.
    else
        Write Data to File.
    endif
goto loop:
```

As is seen, the confirmation request algorithm is equivalent to the stop-and-wait techniques described above, except that the stop-and-wait occurs after N frames have been sent rather than after every frame.

The limitation of the conversational request and confirmation request is that when the Confirm function is called, the transmitting application stops and waits for the Confirmed Reply to be returned. If it takes 500 milliseconds for the receiving unit to receive the Confirm Request, and another 500 milliseconds for the transmitting unit to receive the Confirmed Reply, the transmitting application will wait 1,000 milliseconds. If the receiving unit is faster than the transmitting unit, that time is wasted. Thus, the need exists for implementing pipelined type communications at the application layer in a system architecture and protocol not designed to support such communications at that layer.

SUMMARY OF THE INVENTION

The present invention is directed to a method of, and apparatus for, improving the efficiency of transferring data between a transmitting unit and a receiving unit in an end-to-end layer of a network which does not support pipelined communication in the end-to-end layers. The method comprises the steps of determining a window size N, where N represents the number of frames which can be received by the receiving unit.

The transmitting unit:
   sets a current window size equal to 2N minus one;
   accepts a frame of data to be transmitted;
   decrements the current window size by one;
   transmits the data if the current window size does not equal zero or, if the current window size equals zero, waits to receive a message from the receiving unit before transmitting the data;
   resets the current window size to the current window size plus N upon receipt of the message: and
   returns to the accepting data step if all data has not been sent.

The receiving unit:
   sets a current window size equal to N;
   receives a frame of data from the network;
   decrements the current window size by one;
   sends the message to the transmitting unit and resets the current window size equal to N if the current window size equals zero;
   passes the received data to an application; and
   returns to the receiving data step until all data is received.

In a preferred embodiment of the present invention, the method is practiced in an application layer of an SNA network operating over a half duplex LU6.2 communication sessions. The message sent by the receiving unit is generated by the "(MC_)Request_To_Send" function. Upon sending the message, the receiving unit continues to receive data. Upon receipt of the message, which should occur before the current window size equals zero, the transmitting unit resets the current window size to the current window size plus the window size and continues to transmit frames. In that manner, use of the available bandwidth is maximized even though the architecture and protocol only support stop-and-wait type of communications in the end-to-end layers. Those, and other advantages and benefits of the present invention will become apparent from the Description Of A Preferred Embodiment hereinbelow.

BRIEF DESCRIPTION OF THE DRAWINGS

For the present invention to be clearly understood and readily practiced, the present invention will be described in conjunction with the following figures wherein:

FIG. 4 illustrates the steps of the present invention carried out by the receiving unit.

DESCRIPTION OF A PREFERRED EMBODIMENT

Figure 1:
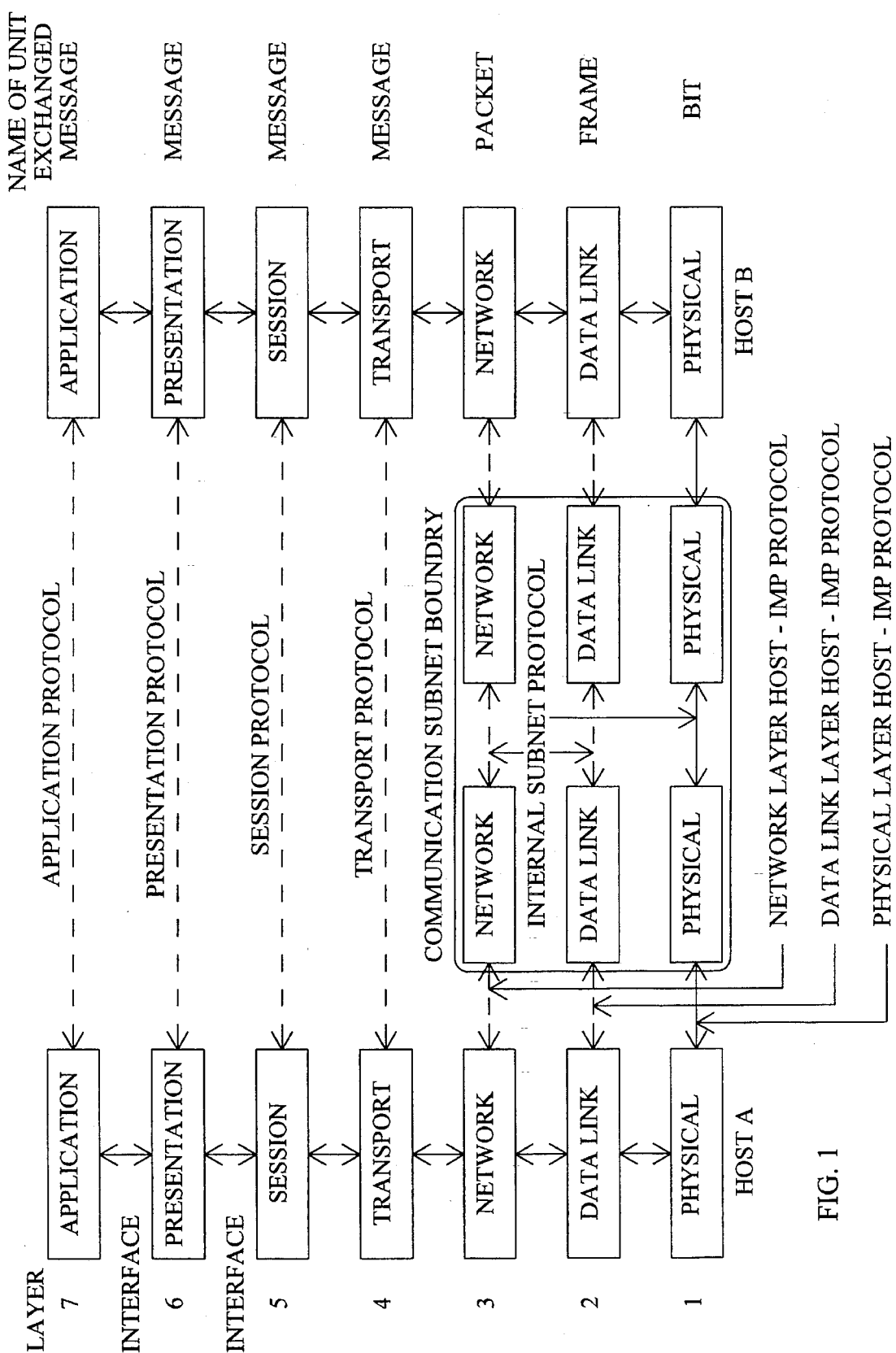
FIG. 1 is a model of a computer network based on the ISO OSI reference model.
Figure 2:
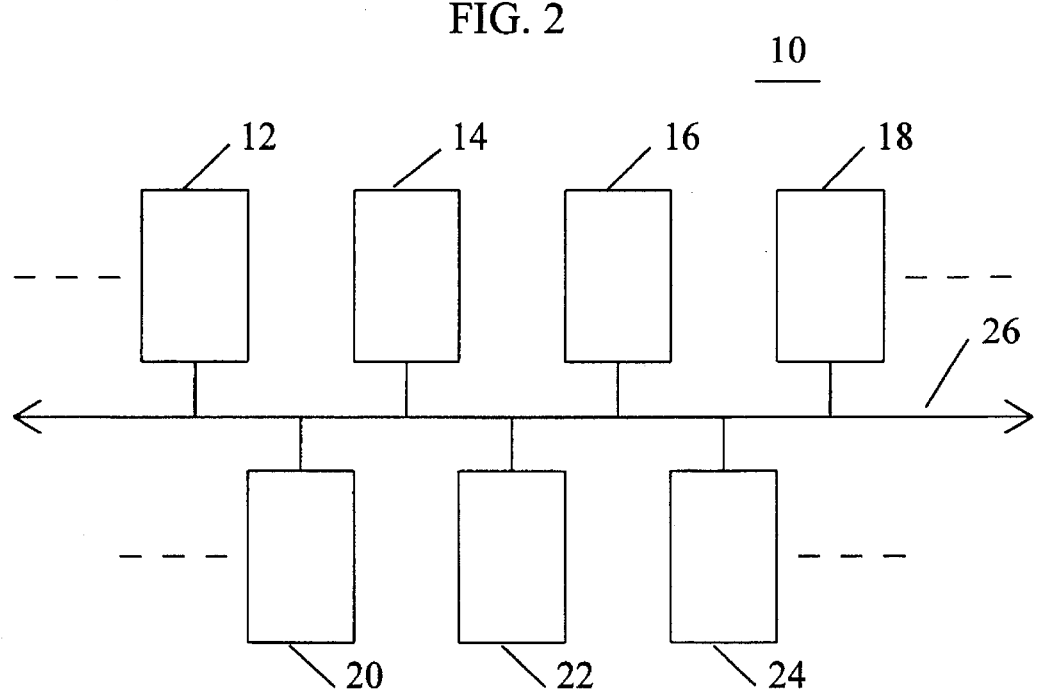
FIG. 2 illustrates a computer network in which the application layer of one unit, the transmitting unit, desires to communicate with the application layer of another unit, the receiving unit, through a number of intermediate logical units.

In FIG. 2, a computer network 10 is illustrated in which a plurality of logical units 12, 14, 16, 18, 20, 22, and 24 are interconnected through a communication channel 26. The network architecture may be, for example, IBM's SNA. The communication protocol over the communication channel 26 between the logical units may be a half-duplex LU6.2. While the present invention is being described in conjunction with a particular network and protocol, the concepts of the present invention are equally applicable to other networks and protocols which do not support pipelined communications over half-duplex communications protocols between the end-to-end layers of the network.

Assume in FIG. 2 that the application layer of logical unit 24, hereinafter the transmitting unit, wishes to send data to the application layer of logical unit 12, hereinafter the receiving unit. The present invention is embodied in software in each of the units 12, 14, 16, 18, 20, 22, and 24 which enables each of the units to act as the transmitting unit or the receiving unit, as the case may be.

Figure 3:
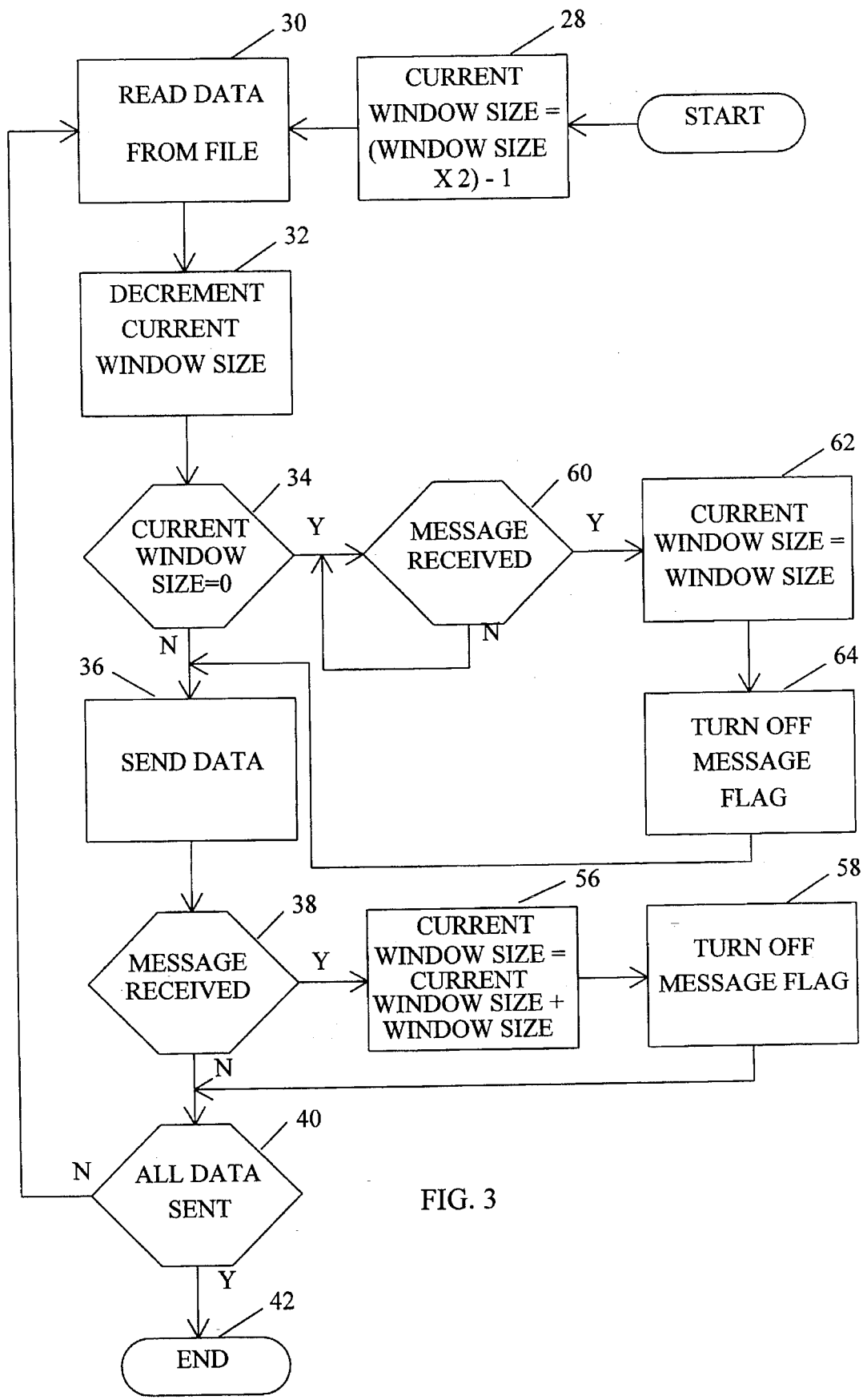
FIG. 3 is a flow chart illustrating the steps of the present invention carried out by the transmitting unit.

Prior to transmitting data, the transmitting unit 24 and receiving unit 12 determine an appropriate window size N, which is the number of frames which the receiving unit 12 can receive, i.e., N is dependent upon the available buffer space in the receiving unit. After the window size N has been determined, the steps illustrated in FIG. 3 are carried out by the software of transmitting unit 24 while the steps illustrated in FIG. 4 are carried out by the software in receiving unit 12. Turning first to the steps of FIG. 3, the first step 28 is to set the current window size equal to the window size times two, minus one. That is accomplished by setting a counter to a value of (2N)−1. After the current window size is set, a frame of data, or some other conveniently sized block of data, is read from a file or otherwise accepted at step 30. After the data has been accepted, the counter representative of the current window size is decremented by 1.

At decision step 34, a comparison is made to determine if the value of the counter representative of the current window size equals zero. As will be explained later, under normal operating circumstances, the value in the counter representative of the current window size should never equal zero. Thus, under normal conditions, the method proceeds to step 36 where the data is transmitted over the network. At step 38 a decision is made as to whether a message has been received from receiving unit 12. If no message has been received, the method continues with step 40 to determine if all data has been transmitted. If not, process control returns to step 30 and the loop is repeated. If all data has been transmitted, the program ends at step 42.

Before explaining the "yes" branches of decision steps 34 and 38, it is appropriate to understand the method performed by the receiving unit 12, which is set forth in FIG. 4. In FIG. 4, the value in a counter which is representative of the current window size is set equal to the window size at step 44. At step 46 a frame of data is received from the network. At step 48 the value in the counter holding the current window size is decremented by one. At step 50 a decision is made with respect to whether the current window size equals zero. If the current window size does not equal zero, the data received at step 46 is written to a file, passed to an application, or otherwise transferred at step 52 and a decision is made at step 54 if more data is available. If more data is available, the program loops back to step 46. If no more data is available, the program ends.

Unlike the counter holding the value of the current window size in the transmitting unit, which is initially set to two times the size of the window minus one, the current window size in the receiving unit is set equal to the window size. Thus, at step 50 in FIG. 4, the current window size will equal zero before the current window size will equal zero at step 34 in FIG. 3. When the current window size in the receiving unit equals zero at step 50, a message is sent at step 56 to the transmitting unit. That message is, in effect, an acknowledgement that the first window of N frames has been safely received. At step 58 the current window size is again set equal to the window size and process control proceeds with step 52.

Returning now to FIG. 3, it is seen that at the decision step 38, the message sent at step 56 in FIG. 4 by the receiving unit is received by the transmitting unit. Typically, a flag will be set to indicate receipt of the message from the receiving unit. Because of that, process control proceeds with step 56 in which the current window size is set equal to the current window size plus the window size. Thereafter, at step 58, the flag representative of the message is turned off and process control continues with step 40. In that manner, once the transmitting unit is aware that the receiving unit has received the first window, the transmitting unit knows it is safe to transmit another window, so the current window size is set equal to the current window size plus the window size at step 56. During normal operation, the message from the receiving unit should always be received before the current window size equals zero in step 34 such that the "yes" branch of the flow chart should not normally be carried out.

In abnormal circumstances, the message from the receiving unit may not be received by the time that the current window size equals zero as determined in step 34. Once the current window size equals zero, process control proceeds with step 60 in which a determination is made if the flag is on thus indicating that the message from the receiving unit has been received. If not, transmission stops, and the program waits until the message is received. Once the message has been received, the current window size is set equal to the window size at step 62, the flag indicative of receipt of the message is turned off at step 64, and process control proceeds with step 36.

Looking at the frames sent over time, we see the following frame sequence:

1, 2, 3, 4, . . . N−1, N, N+1, N+2, . . . 2N−1, (wait for message from receiving unit if necessary)

Looking at the frames received over time, we see:

1, 2, 3, 4, . . . N−1, N, (send message to transmitting unit), N+1, N+2, . . .

As seen from the frame sequences received, once the $N^{th}$ frame has been received, the message is sent to the transmitting unit indicating that the first window has been safely received. Once that message has been received by the transmitting unit, the current size of the window is reset so that the current window size does not, under normal circumstances, reach zero.

In an SNA architecture using an LU6.2 protocol, the sending application shown functionally in FIG. 3 may be implemented as follows:

```
Current_Window_Size = (Window_Size *2) - 1
    loop:
        Read Data from file
        decrement Current_Window_Size
        while (Current_Window_Size = 0)
            (MC_)Test_Request_To_Send
            If RequestToSend indicator set
                Current_Window_Size = Window_Size
            Turn off RequestToSend indicator
            endif
        endwhile
        Send Data over communication network
        If Request To Send indicator was on
            Current_Window_Size = Current_Window_Size +
            Window_Size
            Turn off RequestToSend indicator
    goto loop:
```

The corresponding receiving application segment is:

```
Current_Window_Size = Window_Size
    loop:
        Receive Data from communication network
        decrement Current_Window_Size
        if Current_Window_Size = 0
            (MC_)Request_To_Send/* Send indicator to
            partner*/
            Current_Window_Size = Window_Size
        Write Data to file
goto loop:
```

The above algorithm is not a pure pipeline, sliding-window algorithm because it does not acknowledge every packet, only every window-sized packet. However, it does achieve the goal of maximizing use of the available bandwidth because there can be 2N-1 buffers in transition before the transmitting algorithm stops and waits. Under normal circumstances, the message from the receiving unit confirming that the first window has been received will be received by the transmitting unit before 2N-1 buffers are in transition. Thus, the present invention maximizes throughput over a half-duplex communications protocol in end-to-end layers which do not support pipelined communication.

Although the present invention has been explained in connection with SNA architecture and the LU6.2 protocol, the reader should understand that the concept of the present invention can be applied to other system architectures and protocols. The selection of which function to use as the confirmation message requires only that the selected function not cause the transmitting unit to pause to process it, only that it cause a flag to be set in the transmitting unit. On the receiving unit side, the function should be selected such that upon taking the appropriate action, the receiving unit does not pause. Also, the function should be one which will not cause a problem when the receiving unit does not receive a response to the message which it sends out. Within those parameters, any function may be used.

While the present invention has been described in conjunction with a preferred embodiment thereof, numerous variations and modifications are anticipated. This disclosure and the following claims is intended to cover all such modifications and variations.

What is claimed is:

1. A method of improving the efficiency of transferring data between a transmitting unit and a receiving unit in an end-to-end layer of a network which does not support pipelined communications in the end-to-end layers, said method comprising the steps of:

determining a window size N, where N represents a number of frames;
   the transmitting unit:
      setting a current window size equal to 2N minus one;
      accepting a frame of data for transmission;
      decrementing the current window size;
      transmitting the data if the current window size does not equal zero but, if the current window size equals zero, waiting to receive a message from the receiving unit before transmitting the data;
      resetting the current window size to the current window size plus N upon receipt of said message: and
      returning to the accepting data step if all data has not been sent;
   the receiving unit:
      setting a current window size equal to N;
      receiving a frame of data from the network;
      decrementing the current window size;
      sending the message to the transmitting unit and resetting the current window size equal to N if the current window size equals zero;
      transferring the received data; and
      returning to the receiving data step until all data is received.

2. An apparatus for improving the efficiency of transferring data between a transmitting unit and a receiving unit in an end-to-end layer of a network which does not support pipelined communications in the end-to-end layers, comprising:

means for determining a window size N, where N represents a number of frames;
   the transmitting unit comprising:
      counter means for storing a current window size which initially is equal to 2N-1;
      means for accepting a frame of data for transmission;
      means for decrementing the current window size stored in said counter means;
      means for transmitting the data if the current window size does not equal zero but, if the current window size equals zero, waiting to receive a message from the receiving unit before transmitting the data;
      means for resetting the current window size to the current window size plus N upon receipt of said message:
      means for determining whether all of the data has been transmitted;
   the receiving unit comprising:
      counter means for storing the current size of a window which initially is equal to N;
      means for receiving a frame of data from the network;
      means for decrementing the current window size stored in said counter means;
      means for sending the message to the transmitting unit and resetting the current window size equal to N if the current window size equals zero;
      means for transferring the received data; and
      means for determining whether all of the data has been received.

3. A method of improving the efficiency of transferring data between a transmitting unit and a receiving unit in an application layer of an SNA network operating an LU6.2 communications session, comprising the steps of:

the transmitting unit and receiving unit agreeing upon a window size;

the transmitting unit:

setting a current window size equal to two times the window size minus one;

accepting data for transmission;

decrementing the current window size;

determining if the current window size equals zero and, if so, waiting to receive a message from the receiving unit and, upon receipt of said message, setting the current window size equal to the window size;

sending the data over the network;

setting the current window size equal to the current window size plus the window size if said message was received before the current window size reaches zero; and returning to the accepting data step if all data has not been sent;

the receiving unit:

setting a current window size equal to the window size;

receiving a frame of data from the network;

decrementing the current window size;

sending the message to the transmitting unit and resetting the current window size equal to the window size if the current window size equals zero;

transferring the data; and returning to the receiving data step until all data is received.

4. The method of claim 3 wherein the step of sending the message includes calling the function (MC__)Request__To__Send.

\* \* \* \* \*